United States Patent
Yamamoto et al.

(10) Patent No.: US 12,384,519 B2
(45) Date of Patent: Aug. 12, 2025

(54) LEADING-EDGE HIGH-LIFT DEVICE, WING, AND AIRCRAFT

(71) Applicants: JAPAN AEROSPACE EXPLORATION AGENCY, Tokyo (JP); KAWASAKI JUKOGYO KABUSHIKI KAISHA, Kobe (JP); MITSUBISHI HEAVY INDUSTRIES, LTD., Tokyo (JP)

(72) Inventors: Kazuomi Yamamoto, Tokyo (JP); Mitsuhiro Murayama, Tokyo (JP); Yuzuru Yokokawa, Tokyo (JP); Masataka Kohzai, Tokyo (JP); Kazuhide Isotani, Kobe (JP); Yosuke Ueno, Kobe (JP); Kenji Hayama, Kobe (JP); Kensuke Hayashi, Nagoya (JP)

(73) Assignees: JAPAN AEROSPACE EXPLORATION AGENCY, Tokyo (JP); KAWASAKI JUKOGYO KABUSHIKI KAISHA, Kobe (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/560,854

(22) PCT Filed: Mar. 31, 2022

(86) PCT No.: PCT/JP2022/016742
§ 371 (c)(1),
(2) Date: Nov. 14, 2023

(87) PCT Pub. No.: WO2022/239574
PCT Pub. Date: Nov. 17, 2022

(65) Prior Publication Data
US 2024/0246657 A1 Jul. 25, 2024

(30) Foreign Application Priority Data
May 14, 2021 (JP) .................................. 2021-082182

(51) Int. Cl.
*B64C 9/24* (2006.01)
(52) U.S. Cl.
CPC ..................................... *B64C 9/24* (2013.01)
(58) Field of Classification Search
CPC ....................................................... B64C 9/24
See application file for complete search history.

(56) References Cited

U.S. PATENT DOCUMENTS

| 6,457,680 B1 | 10/2002 | Dobrzynski et al. |
| 8,424,810 B1 | 4/2013 | Shmilovich et al. |

(Continued)

FOREIGN PATENT DOCUMENTS

| JP | 2009-6987 A | 1/2009 |
| JP | 4699487 B2 | 3/2011 |
| JP | 2011-162154 A | 8/2011 |

OTHER PUBLICATIONS

Pott-Pollenske, M. et al., "Aerodynamic and Acoustic Design of Silent Leading Edge Devices," American Institute of Aeronautics and Astronautics, Jun. 16-20, 2014, pp. 1-15.

(Continued)

*Primary Examiner* — Valentina Xavier
(74) *Attorney, Agent, or Firm* — Saliwanchik, Lloyd & Eisenschenk

(57) ABSTRACT

A leading-edge high-lift device according to an embodiment of the present invention is a leading-edge high-lift device that is deployable and retractable from/into a fixed leading edge of a main wing of an aircraft and includes: a leading edge portion; a trailing edge portion that forms a gap between a trailing edge portion and the main wing during deployment; a cusp portion formed at a lower edge of the (Continued)

leading edge portion; a lower surface portion formed between the cusp portion and the trailing edge portion; and a curved hump portion that is locally provided on a surface of the lower surface portion and protrudes toward the main wing in a cross-sectional shape perpendicular to a wing span direction of the main wing.

12 Claims, 12 Drawing Sheets

(56) References Cited

U.S. PATENT DOCUMENTS

| | | |
|---|---|---|
| 9,242,720 B2 | 1/2016 | Turner et al. |
| 2010/0084508 A1 | 4/2010 | Hirai et al. |
| 2012/0097791 A1 | 4/2012 | Turner et al. |
| 2012/0286101 A1 | 11/2012 | Hirai et al. |
| 2019/0112029 A1* | 4/2019 | Turner ............... B64C 3/50 |

OTHER PUBLICATIONS

International Search Report dated May 24, 2022 in International Application No. PCT/JP2022/016742.

* cited by examiner

Chord length Cstow of main wing when slat and flap are retracted

LEADING-EDGE HIGH-LIFT DEVICE, WING, AND AIRCRAFT

CROSS-REFERENCE TO RELATED APPLICATIONS

This application is the U.S. national stage application of International Patent Application No. PCT/JP2022/016742, filed Mar. 31, 2022, which claims the benefit under 35 U.S.C. § 119 of Japanese Application No. 2021-082182, filed May 14, 2021, the disclosures of each of which are incorporated herein by reference in their entirety.

TECHNICAL FIELD

The present invention relates to a leading-edge high-lift device mounted on an aircraft's wing and to a wing and an aircraft each including the same.

BACKGROUND ART

High-lift devices are deployed from an aircraft wing in order to perform low-speed flight when an aircraft takes off or lands at an airport. Leading-edge high-lift devices, e.g., slats attached to a fixed leading edge that is a leading edge of the main wing of the aircraft, especially in an airliner, for example, generate high lift during low-speed flight.

The slats increase the upper limit (maximum lift) of lift of the aircraft wing with gaps formed between the slats and the fixed leading edge. However, they also generate high aerodynamic noise under flight conditions in an approach and landing phase. The noise comes from turbulence in reverse flow regions formed at concaves (coves) formed on lower surfaces of the slats due to constraints for retracting the slats in the aircraft wing. Reducing pressure fluctuations caused by such turbulence allows slat noise reduction, but it is necessary to achieve both requirements for flight performance, such as maximum lift on the slats and structures and deployment mechanisms.

The concept "cove filler" that adds a curved shape along a shear layer in the reverse flow region to a slat lower surface for avoiding the reverse flow region in the cove is known as a typical technology for slat noise reduction (see Patent Literatures 1 to 3).

Other known methods are, for example, a method (see Patent Literature 4) of providing a cusp of a slat lower surface where the reverse flow region is generated with a "serration" that actively mixes a shear layer in the cove for preventing large pressure fluctuations, a method (see Patent Literature 5) of providing a slat lower surface with an "inclined plate" for changing an angle of the shear layer in the reverse flow region that impinges on the slat lower surface, and a technology (see Non-Patent Literature 1) of designing a very long chord slat, which is called VLCS.

CITATION LIST

Patent Literature

Patent Literature 1: U.S. Pat. No. 6,457,680
Patent Literature 2: U.S. Pat. No. 9,242,720
Patent Literature 3: U.S. Pat. No. 8,424,810
Patent Literature 4: Japanese Patent Application Laid-open No. 2011-162154
Patent Literature 5: Japanese Patent No. 4699487

Non-Patent Literature

Non-Patent Literature 1: Pott-Polenske, M., Wild, J., and Bertsch, L., "Aerodynamic and Acoustic Design of Silent Leading Edge Devices," AIAA Paper 2014-2076, 20th AIAA/CEAS Aeroacoustics Conference, 16-20 Jun. 2014.

DISCLOSURE OF INVENTION

Technical Problem

The technologies described in Patent Literatures 1 to 3 achieve significant noise reduction. However, the need for large cove shape deformation during retraction in the aircraft wing introduces complex mechanisms and increased aircraft weight.

Moreover, the technology disclosed in Patent Literature 4 reduces low-frequency peak sound but t h increases high-frequency noise; thus, the technology cannot sufficiently reduce noise.

In addition, the technology disclosed in Patent Literature 5 requires less shape deformation than with the cove filler but cannot sufficiently reduce noise.

The technology disclosed in Non-Patent Literature 1 requires the slat length to be nearly double the conventional slat, so the technology cannot be achieved under constraints on the conventional wing structure.

In view of the circumstances mentioned above, it is an objective of the present invention to provide a leading-edge high-lift device that can achieve both noise reduction and requirements for flight performance and a wing and an aircraft each including the same.

Solution to Problem

A leading-edge high-lift device according to an embodiment of the present invention is a leading-edge high-lift device that is deployable and retractable from/into a fixed leading edge of a main wing of an aircraft and includes:
  a leading edge portion;
  a trailing edge portion that forms a gap between a trailing edge portion and the main wing during deployment;
  a cusp portion formed at a lower edge of the leading edge portion;
  a lower surface portion formed between the cusp portion and the trailing edge portion; and
  a curved hump portion that is locally provided on a surface of the lower surface portion and protrudes toward the main wing in a cross-sectional shape perpendicular to a wing span direction of the main wing.

Since the leading-edge high-lift device includes the hump portion locally provided on the surface of the lower surface portion, the distance between a reattachment point of a turbulent shear layer on the lower surface portion and the trailing edge portion can be set to be longer than that in a case where no hump portion is provided. Accordingly, pressure fluctuations at the trailing edge portion can be attenuated, and noise reduction can be achieved.

Assuming that, in a cross-sectional shape perpendicular to the wing span direction of the main wing, a distance between the leading edge portion and the fixed leading edge, which is measured on the chord line of the leading-edge high-lift device during maximum deployment from the fixed leading edge, is a first distance and a distance between a top portion of the hump portion and the fixed leading edge, which is measured on the chord line of the leading-edge high-lift device during maximum deployment from the fixed leading edge, is a second distance, the second distance may be 10% or more and 40% or less of the first distance.

Assuming that in a cross-sectional shape perpendicular to the wing span direction of the main wing, a distance between the leading edge portion and the fixed leading edge, which is measured on the chord line of the leading-edge high-lift device during maximum deployment from the fixed leading edge, is a first distance, a maximum thickness of the hump portion from the surface of the lower surface portion may be 5% or more and 15% or less of the first distance.

Assuming that in a cross-sectional shape perpendicular to the wing span direction of the main wing, a distance between the leading edge portion and the fixed leading edge, which is measured on the chord line of the leading-edge high-lift device during maximum deployment from the fixed leading edge, is a first distance, an average curvature of a top portion of the hump portion may be double or more than double and ten times or less than ten times a multiplicative inverse of the first distance.

Assuming that in a cross-sectional shape perpendicular to the wing span direction of the main wing, a distance between the leading edge portion and the fixed leading edge, which is measured on the chord line of the leading-edge high-lift device during maximum deployment from the fixed leading edge, is a first distance, an amount of overlap that is a distance between the trailing edge portion and the fixed leading edge, which is measured on the chord line of the leading-edge high-lift device during maximum deployment from the fixed leading edge, may be 35% or less of the first distance.

The leading-edge high-lift device may further include an adjustment member that is attached to at least a part of the trailing edge portion and adjusts the amount of overlap.

The hump portion may be configured to expand during deployment from the fixed leading edge and be deformable along the fixed leading edge during retraction into the fixed leading edge.

A leading-edge high-lift device according to another embodiment of the present invention is a leading-edge high-lift device that is deployable and retractable from/into a fixed leading edge of a main wing of an aircraft and includes: a leading edge portion; a trailing edge portion that forms a gap between a trailing edge portion and the main wing during deployment; a cusp portion formed at a lower edge of the leading edge portion; a lower surface portion formed between the cusp portion and the trailing edge portion; and a trailing edge extension portion provided on at least a part of the trailing edge portion.

Assuming that, in a cross-sectional shape perpendicular to the wing span direction of the main wing, a distance between the leading edge portion and the fixed leading edge, which is measured on the chord line of the leading-edge high-lift device during maximum deployment from the fixed leading edge, is a first distance, an amount of overlap that is a distance between a tip end portion of the trailing edge extension portion and the fixed leading edge, which is measured on the chord line of the leading-edge high-lift device during maximum deployment from the fixed leading edge, is 10% or more and 35% or less of the first distance, and
 the first distance is 10% or more and 20% or less of the chord length of an aircraft wing during retraction of the leading-edge high-lift device into the fixed leading edge.

This leading-edge high-lift device can increase the distance between the reattachment point of the turbulent shear layer on the lower surface portion and the trailing edge portion. Accordingly, pressure fluctuations at the trailing edge portion can be attenuated, and noise reduction can be achieved.

The trailing edge extension portion may be an adjustment member that is attached to the trailing edge portion and adjusts the amount of overlap.

Advantageous Effects of Invention

In accordance with the present invention, both noise reduction and flight performance requirements can be achieved.

MODE(S) FOR CARRYING OUT THE INVENTION

Hereinafter, an embodiment of the present invention will be described with reference to the drawings.

[Overview of High-Lift Device]

Figure 1:
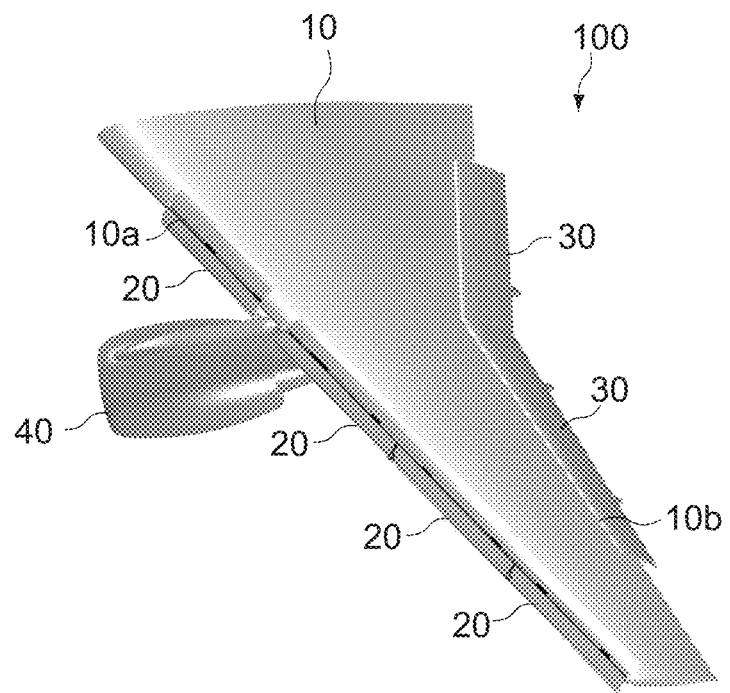
FIG. 1 A partial perspective view of a configuration example of an aircraft wing from an upper surface side.
Figure 2:
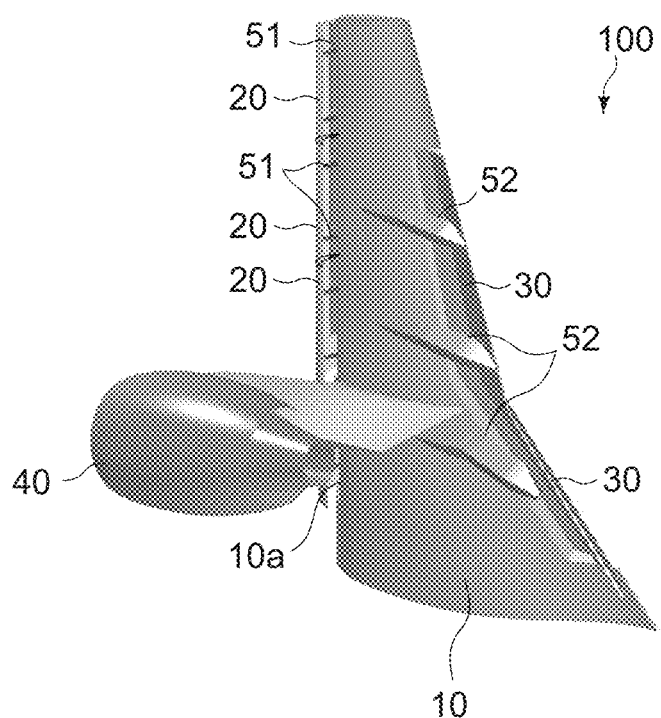
FIG. 2 A partial perspective view of the aircraft wing as viewed from a lower surface side.
Figure 3:
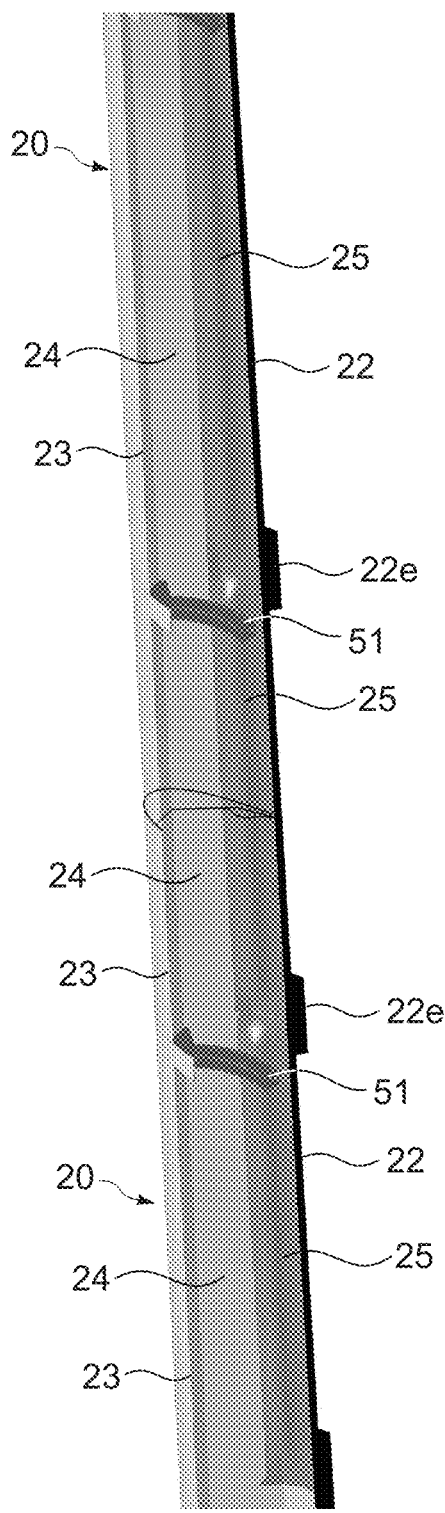
FIG. 3 A partial perspective view of leading-edge high-lift devices as viewed from the lower surface side.

FIG. 1 is a partial perspective view of a configuration example of an aircraft wing (left wing) 100 as viewed from an upper surface side. FIG. 2 is a partial perspective view of the aircraft wing 100 as viewed from a lower surface side. FIG. 3 is a partial perspective view as viewed from the lower surface side of slats 20 constituting the aircraft wing 100.

The aircraft wing 100 includes a main wing 10, the slats 20 disposed on the side of a leading edge 10a of the main wing 10, and flaps 30 disposed on the side of a trailing edge 10b of the main wing 10.

It should be noted that the other aircraft wing (right wing) is configured to be similar to the aircraft wing 100.

The slats 20 are configured to be deployable and retractable from/into the leading edge 10a of the main wing 10. The slats 20 are retracted into the leading edge 10a of the main wing 10 as shown in the figure in a cruise phase and deployed from the leading edge 10a of the main wing 10 by slat supporting devices 51 in a landing or take-off phase. The leading edge 10a of the main wing 10 refers to a region facing the slats 20 in the chord direction of the slats 20. It should be noted that in the following description, the leading edge 10a will be also referred to as a fixed leading edge 10a.

The flaps 30 are configured to be deployable and retractable from/into the trailing edge 10b of the main wing 10. The flaps 30 are retracted into the trailing edge 10b of the main wing 10 as shown in the figure in a cruise phase and deployed from the trailing edge 10b of the main wing 10 through flap supporting devices 52 in a landing or take-off phase.

The slats 20 are typically divided into a plurality of slats along the fixed leading edge 10a with the engine 40 provided therebetween. The length of each slat 20 in a wing span direction is arbitrarily set to a required length depending on the installed region. Also, the flaps 30 are typically divided into a plurality of flaps along the trailing edge 10b of the main wing 10, each having an arbitrary length. The slats 20 and the flaps 30 are made of, for example, a metal material such as an aluminum alloy or stainless steel or a composite material such as carbon fiber reinforced plastics (CFRP) or glass fiber reinforced plastics (GFRP).

The slat 20 is one of the leading-edge high-lift devices. Providing a gap between the slat 20 and the main wing 10, which allows airflow to pass therethrough during deployment, increases maximum lift (upper limit of lift) of the aircraft wing 100 and increases a stall angle of attack of the aircraft wing 100. The size of the gap between the slat 20 and the main wing 10 is adjusted depending on a degree (angle) of deployment of the slat 20 from the main wing 10. Typically, the slat 20 is more largely deployed in a landing phase than in a take-off phase. However, the gap between the slat 20 and the main wing 10 causes noise generation due to pressure fluctuations associated with turbulence in a reverse flow region.

In view of this, in the present embodiment, the slat 20 is configured to suppress the noise generation due to pressure fluctuations caused by the gap between the slat 20 and the main wing 10 during deployment. Although it will be described later in detail, a slat having a baseline shape (hereinafter, also referred to as a reference slat 120) that is a base for designing the slat 20 according to the present embodiment will be first described.

It should be noted that the reference slat 120 corresponds to a slat with the conventional structure optimized only in terms of the aerodynamic performance.

[Reference Slat]

Figure 4:
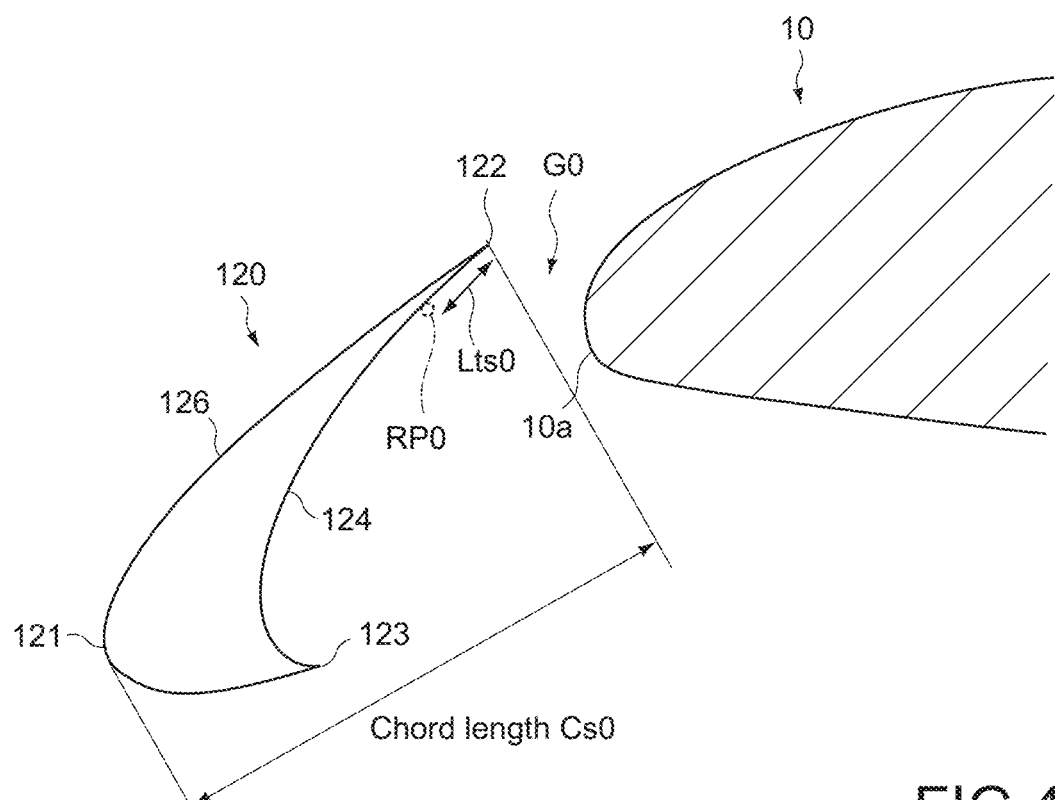
FIG. 4 A cross-sectional view of a reference-shape slat (reference slat), which is perpendicular to the wing span direction of a main wing.

FIG. 4 is a cross-sectional view of the reference slat 120, which is perpendicular to the wing span direction of the main wing 10. Here, a state of the reference slat 120 in a landing phase when deployed at the maximum (fully deployed) from the fixed leading edge 10a is shown.

The reference slat 120 includes a leading edge portion 121, a trailing edge portion 122, a cusp portion 123, a lower surface portion 124, and an upper surface portion 126. As shown in FIG. 4, the cross-sectional shape of the reference slat 120 is a shape that forms a closed space surrounded by the leading edge portion 121, the lower surface portion 124, and the upper surface portion 126.

The leading edge portion 121 has a streamlined shape protruding forwards (opposite to the main wing 10). The leading edge portion 121 is formed continuously with the upper surface portion 126.

The trailing edge portion 122 is a tip-end portion of an edge formed by a rear-end portion of the lower surface portion 124 and a rear-end portion of the upper surface portion 126. During deployment, the trailing edge portion 122 forms a gap G0 between the trailing edge portion 122 and the main wing 10.

The cusp portion 123 is a tip-end portion of an edge formed between a lower edge of the leading edge portion 121 and the lower surface portion 124. The cusp portion 123 may be formed as a tip-end portion of a blade protruding toward the fixed leading edge 10a, the blade being disposed at the lower edge of the leading edge portion 121.

The lower surface portion 124 is a concave surface formed between the cusp portion 123 and the trailing edge portion 122. The lower surface portion 124 is a portion proximate to the fixed leading edge 10a during retraction. The lower surface portion 124 is typically formed in a curved shape protruding forwards, corresponding to the fixed leading edge 10a.

Figure 5:
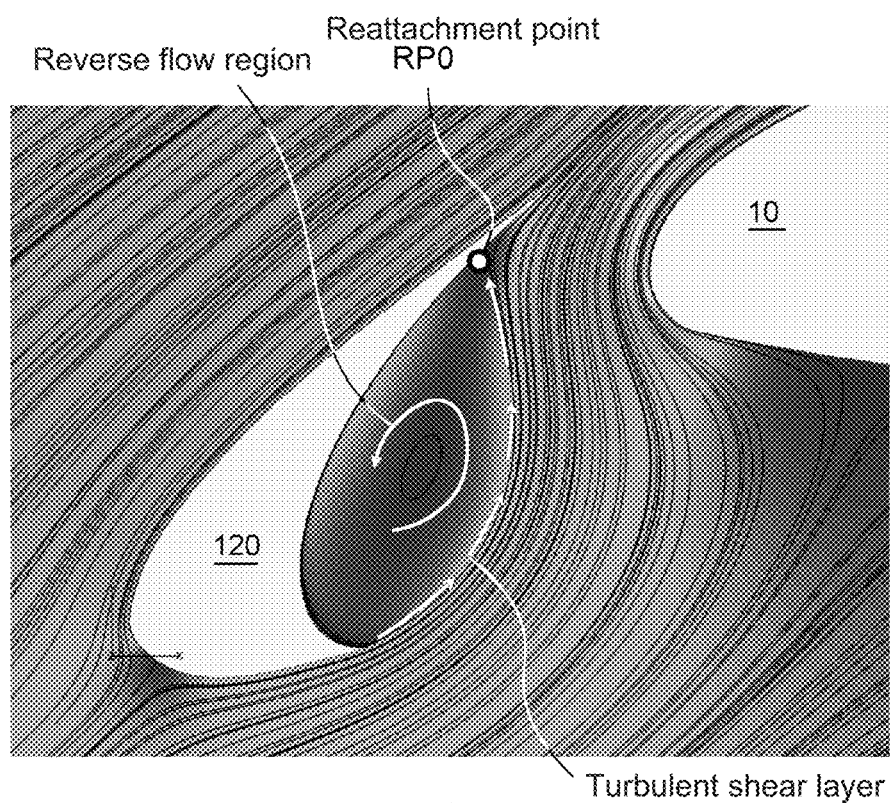
FIG. 5 A numerical simulation result showing an example of a flow field in the reference slat shown in FIG. 4 in a landing phase.

FIG. 5 is a numerical simulation result showing an example of a flow field of the reference slat 120 shown in FIG. 4 in a landing phase.

As shown in the figure, a shear layer separated from the cusp portion 123 forms a vortex-like reverse flow region on the lower surface portion 124, and turbulence of the shear layer is generated with the formation of the reverse flow region. The generated turbulent shear layer reattaches to the lower surface portion 124 and then passes through the gap G0 between the reference slat 120 and the main wing 10.

Noise is generated mainly by pressure fluctuations at a reattachment point RP0 of the lower surface portion 124, where the turbulent shear layer reattaches, and pressure fluctuations at the trailing edge portion 122. The pressure fluctuations become the maximum at the reattachment point RP0 and are attenuated toward the trailing edge portion 122. The pressure fluctuations at the trailing edge portion 122 decrease with an increase in distance between the reattachment point RP0 and the trailing edge portion 122. In the example shown in the figure, the reattachment point RP0 is closer to the trailing edge portion 122. Therefore, large pressure fluctuations at the reattachment point RP0 are not attenuated and provide large pressure fluctuations at the trailing edge portion 122. As a result, significant noise is generated.

In view of this, focusing on a strong correlation between the noise level caused by the cross-sectional shape of the reference slat 120 and a distance Lts0 that is the shortest distance along the lower surface from the reattachment point RP0 of the turbulent shear layer on the lower surface portion 124 to the trailing edge portion 122, the inventors of the present invention has achieved noise reduction by increasing the distance $Lts0$ to attenuate pressure fluctuations toward the trailing edge portion 122 from the reattachment point RP0.

Specifically, for example, the shape of the reference slat 120 is modified as follows.

(1) To provide a rounded hump portion near a reattachment point of a turbulent shear layer on a slat lower surface, the rounded hump portion having a structure deformable during retraction into the main wing.

(2) To extend the trailing edge portion so as to increase overlap with the main wing 10 than the reference slat 120 optimized only in terms of the aerodynamic performance.

Such modifications (1) and (2) may be made independently or may be combined.

[Slat According to Present Embodiment]

Hereinafter, details of the slat 20 according to the present embodiment will be described with two configuration examples. Configuration Example 1 corresponds to a combination of (1) and (2) above and Configuration Example 2 corresponds to (2).

It should be noted that although one slat 20 will be described as an example in the following description, the configurations may be similarly applied to all other slats 20 mounted on the fixed leading edge 10a. In this case, the way to apply to the slat may be individually optimized depending on the slat supporting device 51 and flows at an inner end portion of the slat 20 and an outer end portion of the slat 20.

<Slat According to Configuration Example 1>

Figure 6:
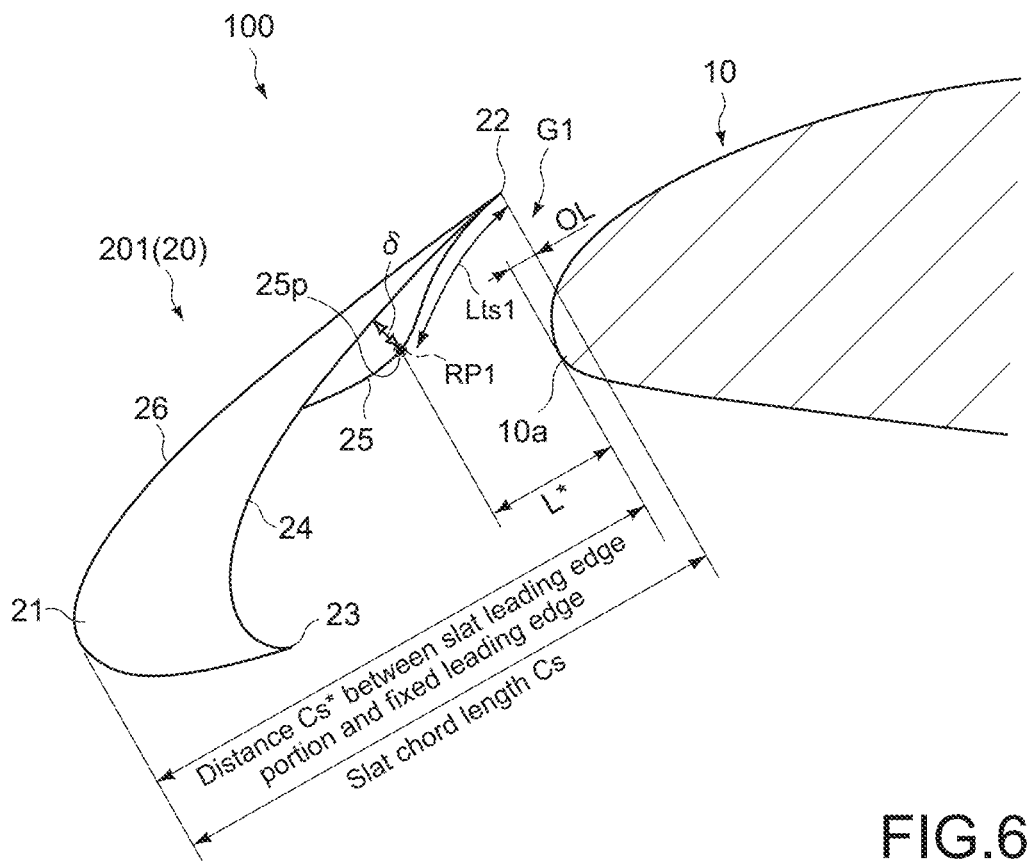
FIG. 6 A cross-sectional view of the slat, which is perpendicular to the wing span direction according to Configuration Example 1 of the present embodiment.

FIG. 6 is a cross-sectional view of a slat 201 according to Configuration Example 1 that is the slat 20 as the leading-edge high-lift device according to the present embodiment, which is perpendicular to the wing span direction of the main wing 10 (hereinafter, also referred to as a wing span direction unless otherwise stated herein). FIG. 6 shows a state in which the slat 201 is deployed at the maximum (fully deployed) from the fixed leading edge 10a in a landing phase.

The slat 201 includes a leading edge portion 21, a trailing edge portion 22, a cusp portion 23, a lower surface portion 24, a hump portion 25, and an upper surface portion 26. As shown in FIG. 6, the cross-sectional shape of the slat 201 is a shape that forms a closed space surrounded by the leading edge portion 21, the lower surface portion 24, and the upper surface portion 26.

The leading edge portion 21 has a streamlined shape protruding forwards (opposite to the main wing 10). The leading edge portion 21 is formed continuously with the upper surface portion 26.

The trailing edge portion 22 is a tip-end portion of an edge formed by a rear-end portion of the lower surface portion 24 and a rear-end portion of the upper surface portion 26. During deployment, the trailing edge portion 22 forms a gap between the trailing edge portion 22 and the main wing 10.

The cusp portion 23 is a tip-end portion of an edge formed between a lower edge of the leading edge portion 21 and the lower surface portion 24. The cusp portion 23 may be formed at a tip-end portion of a blade protruding toward the fixed leading edge 10a, the blade being disposed at the lower edge of the leading edge portion 21.

The lower surface portion 24 is a concave surface formed between the cusp portion 23 and the trailing edge portion 22. The lower surface portion 24 is a portion proximate to the fixed leading edge 10a during retraction. The lower surface portion 24 is formed in a curved shape protruding forwards, corresponding to the fixed leading edge 10a.

The hump portion 25 is locally provided on the surface of the lower surface portion 24 and has a curved shape protruding toward the main wing 10 in the cross-sectional shape perpendicular to the wing span direction.

In Configuration Example 1, the trailing edge portion 22 extends toward the main wing 10, increasing the amount of overlap with the main wing 10, and the hump portion 25 is provided, which are differences from the reference slat 120.

As it will be described later with reference to A to C of FIG. 13, as a characteristic of the flow on the slat, the position where the turbulent shear layer in the cove (on lower surface portion) reattaches to the slat lower surface hardly change in the chord direction of the main wing, unless the flow rate of a flow passing through a gap between the slat trailing edge (TE in the figure (corresponding to the trailing edge portion 122, 22) and the main wing 10 and the position of the cusp portion are greatly changed.

In the present embodiment, using this characteristic, noise reduction is achieved by setting a distance $Lts1$ between a reattachment point RP1 of the turbulent shear layer on the lower surface portion 24 and the trailing edge portion 22 to be longer than the distance $Lts0$ in the reference slat 120 so as to reduce pressure fluctuations at the trailing edge portion 22.

Figure 7:
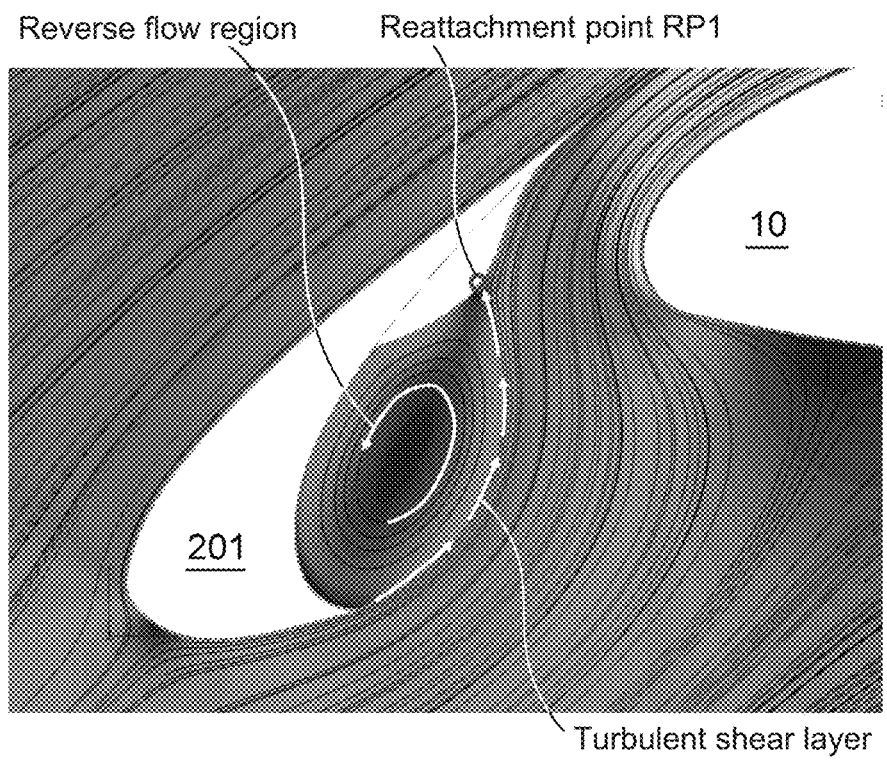
FIG. 7 A numerical simulation result showing an example of a flow field in the slat shown in FIG. 6 in a landing phase.

FIG. 7 is a numerical simulation result showing an example of a flow field in the slat 201 shown in FIG. 6 in a landing phase.

As shown in the figure, a shear layer separated from the cusp portion 23 forms a vortex-like reverse flow region on the lower surface portion 24, and turbulence of the shear layer is generated with the formation of the reverse flow region. The generated turbulent shear layer reattaches to the hump portion 25 and then passes through a gap G1 between the slat 201 and the main wing 10.

Noise is generated mainly by pressure fluctuations at a reattachment point RP1 of the hump portion 25, where the turbulent shear layer reattaches, and pressure fluctuations at the trailing edge portion 22. In this configuration example, the reattachment point RP1 is positioned on the hump portion 25. Therefore, in addition to the trailing edge portion 22 extended longer than the trailing edge portion 122 of the reference slat 120, a distance $Lts1$ that is the shortest distance along the lower surface between the reattachment point RP1 and the trailing edge portion 22 can be set to be longer than the distance $Lts0$ (see FIG. 3) in the reference slat 120. Accordingly, large pressure fluctuations at the reattachment point RP1 can be attenuated toward the trailing edge portion 22, and pressure fluctuations at the trailing edge portion 22 can be reduced. Therefore, noise reduction can be achieved compared to the shape of the reference slat 120.

(Regarding Amount of Overlap)

The amount of overlap (OL amount) between the trailing edge portion 22 of the slat 201 and the main wing 10 refers to a distance (OL) between the trailing edge portion 22 and the fixed leading edge 10a, which is measured on the chord line of the slat 201 deployed at the maximum from the fixed leading edge 10a as shown in FIG. 6. As is clear from FIG. 6, the chord line of a slat 201 means a line obtained by tilting the chord line of the slat 201 in a state retracted in the main wing 10 by the deployment angle. The chord line of the slat 201 in a state retracted in the main wing 10 is along the chord line of the wing 100, not the line connecting the leading edge and the trailing edge of the slat 201.

That is, assuming that Cs denotes the chord length of the slat 201 (slat chord length) and a distance (first distance) between the leading edge portion 21 and the fixed leading edge 10a, which is measured on the chord line of the slat 201 deployed at the maximum from the fixed leading edge 10a, is denoted by Cs*, the amount of overlap OL is expressed as follows.

$$OL = Cs - Cs^*$$

Hereinafter, the first distance Cs* will be also referred to as a reference length Cs*.

The amount of overlap OL is favorably larger to increase the distance Lts1. However, if the overlap amount OL becomes too large, the noise reduction effect reaches a ceiling and the weight increases, which is unfavorable. Therefore, the amount of overlap OL is more favorably set to 35% or less of the reference length Cs* (OL≤35% Cs*). That is, an optimal parameter range of the amount of overlap OL is $$0\% \leq (OL/Cs^*) \leq 35\%.$$

The amount of extension of the trailing edge portion 22 may be uniform in the entire region in the wing span direction, at least a part of the region may be formed as a trailing edge extension portion, or a different amount of extension may be employed depending on a region. For example, as shown in FIG. 3, a trailing edge extension portion 22e extended to be longer than the trailing edge portion 22 may be formed in a partial region of the trailing edge portion 22 in accordance with the position of the slat supporting device 51. In addition, the amount of extension of the trailing edge portion 22 may be optimized in the range of 35% Cs* or less at each arbitrary position in the wing span direction.

The trailing edge extension portion 22e may be formed integrally with the trailing edge portion 22 of the slat 201. Alternatively, the trailing edge extension portion 22e may be additionally attached to a part of the trailing edge portion 22. In this case, the trailing edge extension portion 22e is configured as an adjustment member that adjusts the amount of overlap OL that is a distance between a tip end portion of the trailing edge extension portion 22e and the fixed leading edge 10a. The adjustment member may be attached to the entire region in a span direction of the trailing edge portion 22 or may be locally attached to an arbitrary region of the trailing edge portion 22. The adjustment member is made of, for example, a metal material such as an aluminum alloy or stainless steel or a composite material such as carbon fiber reinforced plastics (CFRP) or glass fiber reinforced plastics (GFRP). The shape of the adjustment member is also not particularly limited, and may be trapezoidal, for example.

Next, the hump portion 25 will be described.

The hump portion 25 is provided in a reattachment region of the turbulent shear layer on the lower surface portion 24. Forming the hump portion 25 in a curved shape protruding toward the main wing 10 allows a distance Lts1 that is the shortest distance along the lower surface between the reattachment point RP1 of the turbulent shear layer and the trailing edge portion 22 to be longer than that of the reference slat 120.

The hump portion 25 is typically formed in the wing span direction. A cross-sectional shape of the hump portion 25, which is perpendicular to the wing span direction, may be uniform in the wing span direction. Alternatively, the shape of the hump portion may be optimized in terms of noise reduction and aerodynamic and structural properties at an arbitrary position in the wing span direction depending on a change in reattachment point position in the wing span direction, pressure fluctuation distribution, and the like.

For example, the thickness of the hump portion 25 is set to be smaller than in other regions, for example, in regions near inner end portions and outer end portions of the slats 20 (see FIG. 1) where the airflow structures are greatly different or regions near the slat supporting devices 51 (see FIGS. 2 and 3). In this manner, the cross-sectional shape of the hump portion 25 may differ between the region near the slat supporting devices 51 and other regions.

The hump portion 25 may be formed integrally with the lower surface portion 24 (formed by curving a part of the lower surface portion 24). Alternatively, the hump portion 25 may be an additional member different from the constituent member of the lower surface portion 24, the additional member being added to a partial region of the lower surface portion 24.

Figure 8:
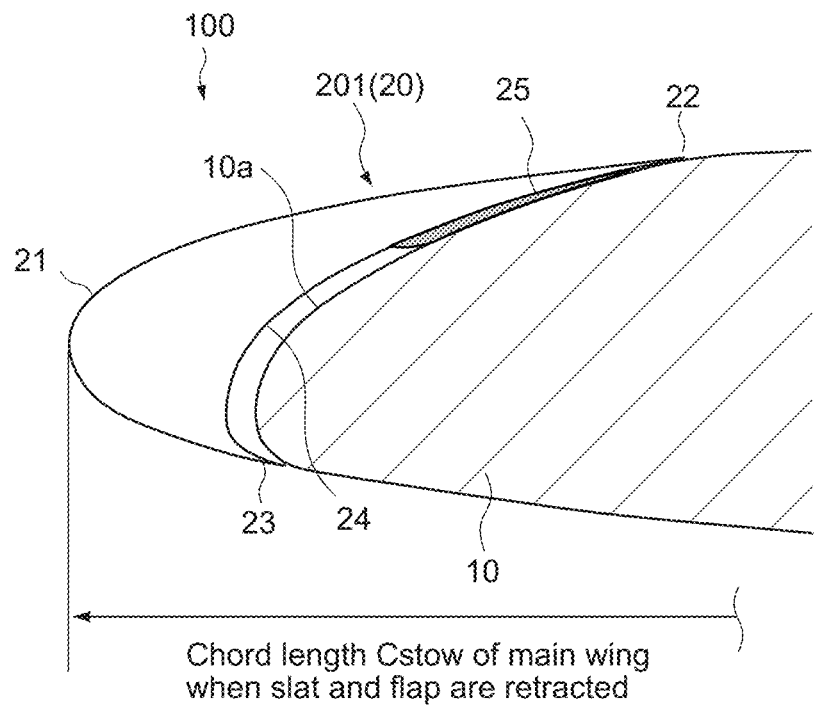
FIG. 8 A cross-sectional view showing a retracted state of the slat shown in FIG. 6 in the main wing.

In view of the property of retraction of the slat 201 into the fixed leading edge 10a, the hump portion 25 is favorably configured to be deformable along the fixed leading edge 10a during retraction as shown in FIG. 8. Accordingly, target aerodynamic performance of the aircraft wings 100 in a cruise phase can be provided. In this case, the hump portion 25 is made of a material (e.g., elastic material or shape memory alloy) or a structure having built-in various mechanism parts (e.g., link mechanisms), which is capable of bulging in a target shape during deployment and of being compressed (e.g. partially or completely flattened) during retraction.

(Shape of Hump Portion)

Regarding the hump portion 25, the distance Lts1 between the reattachment point RP1 of the turbulent shear layer and the trailing edge portion 22 can be set to be longer than the distance Lts0 in the reference slat 120 as described above. However, causing the hump portion 25 to greatly expand accelerates the flow between the hump portion 25 and the fixed leading edge 10a. As a result, the aerodynamic performance is degraded, and increased pressure fluctuations at the reattachment point RP1 increase noise. Thus, it is optimal to set the shape so that the reattachment point RP1 is located at a top portion 25p of the hump portion in order to minimize the hump portion 25.

Moreover, as it will be described later, noise increases with an increase in pressure fluctuations at the reattachment point RP1 in a case where the curvature around the reattachment point RP1 is small or negative (it is concave as viewed from the fixed leading edge 10a). Therefore, the shape is favorably set so that the curvature around the reattachment point RP1 is a certain positive curvature (it is convex as viewed from the fixed leading edge 10a).

(Thickness of Hump Portion)

The top portion 25p of the hump portion 25 typically corresponds to a point of a maximum thickness δ (see FIG. 6) of the hump portion 25. The maximum thickness point & refers to a point where the height from the lower surface portion 24 is at the maximum. The lower surface portion 24 set forth herein is a basis surface for the height. In a case where the hump portion 25 is formed integrally with the lower surface portion 24, it refers to a virtual curve that should be formed as the lower surface portion 24 if there is no hump portion 25. In a case where the hump portion 25 is formed as a member separate from the lower surface portion 24, it refers to a region of the lower surface portion 24 on which the hump portion 25 is mounted. Moreover, the maximum thickness δ of the hump portion 25 refers to a maximum value of the thickness in a direction perpendicular to such a criteria surface.

(Width of Top Portion)

Figure 9:
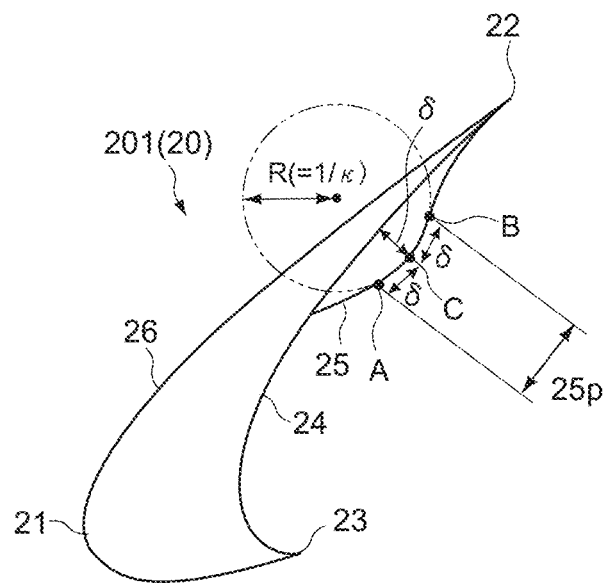
FIG. 9 An explanatory view of the details of a hump portion of the slat shown in FIG. 6.

Accounting for the fact that the curvature around a reattachment point PRI influences the noise reduction effect by the hump portion 25 and that the reattachment point RP1 moves on the surface of the hump portion 25 in accordance with a change in flight conditions (e.g., change in angle of attack) in an approach and landing phase, the top portion 25p should be considered as an area having a width on the order of the thickness of the hump portion 25. In view of this, when the maximum thickness point 8 of the hump portion 25 is defined as a top C in a cross-sectional surface shape of the slat 201, which is perpendicular to the wing span direction, as shown in FIG. 9, the top portion 25p refers to a region between two points A and B on the hump portion 25 which sandwich the top C. Typically, the point A is a position spaced away from the top C toward the leading edge portion 21 along the surface of the hump portion 25 by a distance δ corresponding to the maximum thickness δ. Also, the point B is a position spaced away from the top C toward the trailing edge portion 22 along the surface of the hump portion 25 by the distance δ.

(Curved Surface of Top Portion)

The top portion 25p of the hump portion 25 needs to have a certain positive curvature as described above. The top portion 25p of the hump portion 25 may be formed with a curve surface having a constant curvature or may be formed with a composite curve surface whose curvature differs continuously or for each region. Moreover, the top portion 25p may include planes partially or may be formed with a curved surface made of multiple planes that makes the entire region of the top portion 25p convex (e.g., a partial polygonal surface shape inscribed in the curved surface).

(Position of Top Portion)

The position of the top portion 25p of the hump portion 25 is favorably determined depending on the reattachment point PRI as described above. A distance from the trailing edge portion 22 in a direction along the chord line of the slat 201 to the reattachment point PRI greatly changes depending on design conditions of the slat 201 and the maximum thickness δ of the hump portion 25. The position of the top portion 25p moves away from the trailing edge portion 22 while the maximum thickness & increases.

(Shape from Top Portion to Trailing Edge Portion)

In the cross-sectional shape perpendicular to the wing span direction, a region of the hump portion 25, which is closer to the trailing edge portion 22 than the point B on the top portion 25p, as shown in FIG. 9 is favorably formed as a continuous curve in order not to increase the turbulence at the boundary layer.

It should be noted that such a curve may be formed in a curved shape that is concave with respect to the fixed leading edge 10a in contrast to the hump portion 25 in order to obtain lift near the trailing edge portion 22 as in a case where no hump portion 25 is provided and to keep the flow velocity around the hump portion 25 low so as to prevent an unnecessary increase in pressure fluctuations at the reattachment point RP1.

(Shape from Top Portion to Lower Surface Portion and Cusp Portion)

A region from the point A of the top portion 25p of the hump portion 25 to the lower surface portion 24 on the side of the cusp portion 23, in the cross-sectional shape perpendicular to the wing span direction, as shown in FIG. 9, does not necessarily need to be formed as a continuous curve because the region is in a slow reverse flow. For example, the curve of the region may have a discontinuous tangent at the point connecting to the lower surface portion 24, as shown in FIG. 9, may be a curve with a curvature larger than that of the top portion 25p, or may be a bent line.

Next, shape parameters of the respective parts of the hump portion 25 will be described.

(Maximum Thickness of Hump Portion)

In order to increase the distance Lts1 between the reattachment point RP1 of the shear layer and the trailing edge portion 22 so as to obtain the noise reduction effect, the maximum thickness δ of the hump portion 25 is desirably 5% or more of the reference length Cs* (see FIG. 6), for example. It should be noted that the maximum thickness δ of the hump portion 25 corresponds to a height of the hump portion 25 from the lower surface portion 24 at the position of the top portion 25p of the hump portion 25.

Although increasing the maximum thickness δ of the hump portion 25 increases the distance Lts1, it narrows a flow channel width between the hump portion 25 and the fixed leading edge 10a. This leads to deterioration of the aerodynamic performance of the slat 201 and an unnecessary increase in noise. Therefore, the maximum thickness δ of the hump portion 25 is favorably 15% or less of the reference length Cs*, for example. That is, an optimal parameter range of the maximum thickness δ of the hump portion 25 is $$5\% \le (\delta/Cs^*) \le 15\%.$$

(Position of Hump Portion)

Here, the position of the hump portion 25 is expressed by a distance L* (second distance) between the fixed leading edge 10a and the maximum thickness point (corresponding to the top portion 25p) of the hump portion 25 in the chord direction of the slat 201 as shown in FIG. 6.

A lower limit of the distance L* is 10% or more of the reference length Cs*, for example, because of a limit at which the hump portion 25 with a minimum value (5% Cs*) of the thickness δ can be provided near the trailing edge portion 22.

On the other hand, an upper limit of the distance L* is 40% or less of the reference length Cs* even at the maximum, accounting for a reattachment point in a typical slat design and the presence of the hump portion 25 with a maximum value (15% Cs*) of the thickness δ.

Thus, an optimal parameter range of the position of the hump portion 25 is $$10\% \le (L^*/Cs^*) \le 40\%.$$

(Average Curvature of Top Portion of Hump Portion)

An average curvature of the top portion 25p in the hump portion 25 refers to a curvature ($\kappa = \int \kappa_i ds / \int ds$) that is a weighted average of a local curvature κi in a curve AB of the hump portion 25 in the range of the top portion 25p between the points A and B shown in FIG. 9 with a length s of the curve AB. Moreover, an average curvature radius R of the top portion 25p is equivalent to a multiplicative inverse (1/κ) of the average curvature κ. The top portion 25p is formed with, for example, a uniformly curved surface, combined curved surfaces, or a partially flat surface, as described above.

The average curvature radius R of the top portion 25*p* is favorably 50% or less of the reference length Cs* in order to obtain the noise reduction effect by increasing the distance Lts1 between the reattachment point RP1 of the shear layer and the trailing edge portion 22. On the other hand, it is difficult to obtain the noise reduction effect when flight conditions change (e.g., the angle of attack changes) if the average curvature radius R is small, i.e., less than 10% of the reference length Cs*.

Therefore, an optimal parameter range of the curvature radius of the top portion 25*p* of the hump portion 25 is $$10\% \le (R/Cs^*) \le 50\%,$$

and an optimal parameter range of the average curvature κ of the top portion 25*p* is $$2 \le \kappa Cs^* \le 10,$$

which is double or more than double and ten times or less than ten times a multiplicative inverse of the reference length Cs*.

It should be noted that in Configuration Example 1 described above, the trailing edge portion 22 extends toward the main wing 10 and the hump portion 25 is provided as differences from the reference slat 120. As a matter of course, the present invention can also be applied to a configuration example in which only the hump portion 25 is added to the reference slat 120. The addition of the hump portion 25 enables the distance along the lower surface between the reattachment point of the turbulent shear layer and the trailing edge portion to be longer than the distance Lts0 in the reference slat 120 as described above. Accordingly, large pressure fluctuations at the reattachment point can be further attenuated toward the trailing edge portion and pressure fluctuations at the trailing edge portion can be reduced. Therefore, noise level reduction can be achieved compared to the shape of the reference slat 120.

<Slat According to Configuration Example 2>

Figure 10:
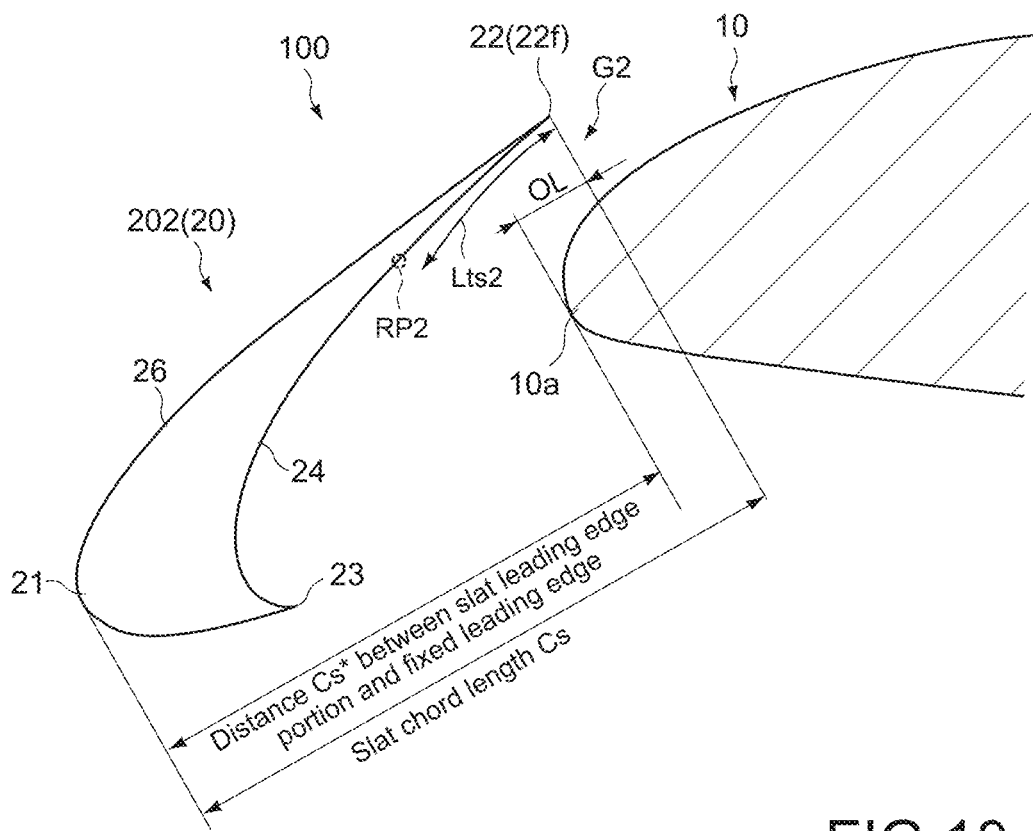
FIG. 10 A cross-sectional view of a slat according to Configuration Example 2 of the present embodiment, which is perpendicular to the wing span direction.

FIG. 10 is a cross-sectional view of a slat 202 according to Configuration Example 2 that is the slat 20 as the leading-edge high-lift device according to the present embodiment, which is perpendicular to the wing span direction of the aircraft wing 100. As in Configuration Example 1 (FIG. 6), FIG. 10 shows a state in which the slat 202 is deployed at the maximum (fully deployed) from the fixed leading edge 10*a* in a landing phase.

The slat 202 includes a leading edge portion 21, a trailing edge portion 22, a cusp portion 23, a lower surface portion 24, and an upper surface portion 26. That is, the slat 202 according to Configuration Example 2 differs from that of Configuration Example 1 in that the slat 202 does not include the hump portion 25. Hereinafter, configurations different from those of Configuration Example 1 will be mainly described, and configurations similar to those of Configuration Example 1 will be denoted by similar reference signs and descriptions thereof will be omitted or simplified.

In Configuration Example 2, the trailing edge portion 22 extends toward the main wing 10 and increases the amount of overlap with the main wing 10, which is different from the reference slat 120. Therefore, as to the trailing edge portion 22 in this configuration example, a region obtained by extending the trailing edge portion of the reference slat 120 toward the main wing 10 will be also referred to as a trailing edge extension portion 22*f*. A tip end portion of the trailing edge extension portion 22*f* corresponds to the trailing edge portion 22 extended by the trailing edge extension portion 22*f*.

As to the amount of extension of the trailing edge portion 22 by the trailing edge extension portion 22*f*, as shown in FIG. 10, assuming that a distance (first distance) between the leading edge portion 21 and the fixed leading edge 10*a*, which is measured on the chord line of the slat 202 during maximum deployment from the fixed leading edge 10*a*, is a reference distance Cs*, the amount of overlap OL that is a distance between the tip end portion of the trailing edge extension portion 22*f* and the fixed leading edge 10*a*, which is measured on the chord line of the slat 202 during maximum deployment from the fixed leading edge 10*a*, is set to 10% or more and 35% or less of the reference distance Cs* as it will be described later.

Figure 11:
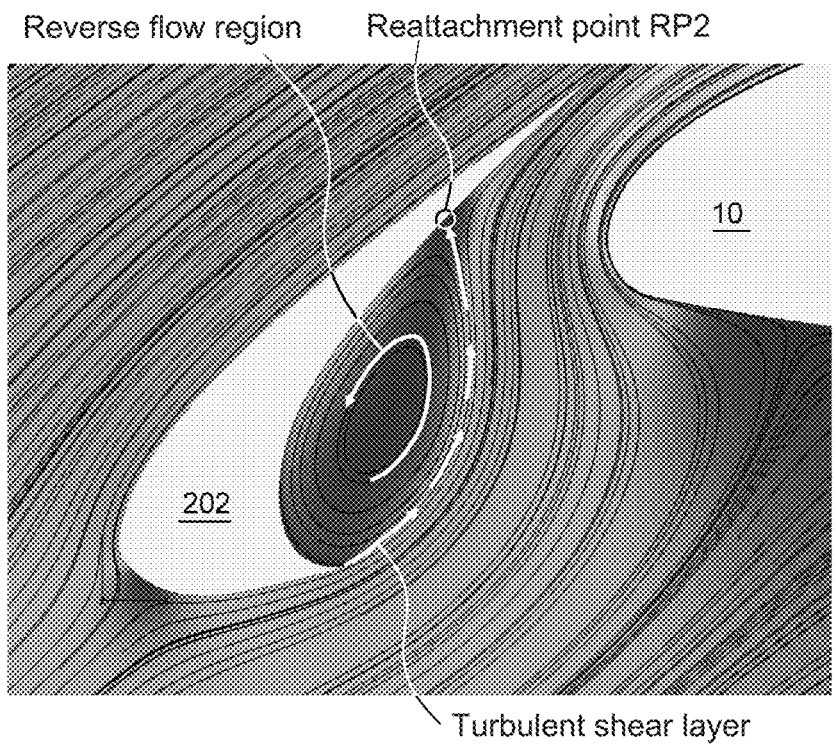
FIG. 11 A numerical simulation result showing an example of a flow field of the slat shown in FIG. 10 in a landing phase.

FIG. 11 is a numerical simulation result showing an example of a flow field in the slat 202 shown in FIG. 10 in a landing phase.

As shown in the figure, a shear layer separated from the cusp portion 23 forms a vortex-like reverse flow region on the lower surface portion 24, and turbulence of the shear layer is generated with the formation of the reverse flow region. The generated turbulent shear layer reattaches to the lower surface portion 24 and then passes through a gap G2 between the slat 202 and the main wing 10.

Noise is generated mainly by pressure fluctuations at a reattachment point RP2 on the lower surface portion 24 where the turbulent shear layer reattaches and pressure fluctuations at the trailing edge portion 22. In this configuration example, the trailing edge portion 22 is extended longer than the trailing edge portion 122 of the reference slat 120 by the trailing edge extension portion 22*f*. Therefore, a distance Lts2 that is the shortest distance along the lower surface between the reattachment point RP2 and the trailing edge portion 22 can be set to be longer than the distance Lts0 (see FIG. 4) in the reference slat 120. Accordingly, large pressure fluctuations at the reattachment point RP2 can be attenuated toward the trailing edge portion 22 and pressure fluctuations at the trailing edge portion 22 can be reduced. Therefore, noise level reduction can be achieved compared to the shape of the reference slat 120.

(Regarding Amount of Overlap)

An amount of overlap OL between the trailing edge portion 22 of the slat 202 and the main wing 10 refers to a distance between the trailing edge portion 22 and the fixed leading edge 10*a*, which is measured on the chord line of the slat 201 deployed at the maximum from the fixed leading edge 10*a*, as in Configuration Example 1 (see FIG. 10).

The amount of overlap OL is favorably at least 10% or more and (OL≥10% Cs*) of the reference length Cs* in order to obtain the noise reduction effect because the distance Lts2 for compensating for the absence of the hump portion 25 is needed. However, if the overlap amount OL becomes too large for increasing the distance Lts2, the noise reduction effect reaches a ceiling and the weight increases, which is unfavorable. The amount of overlap OL is favorably set to 35% or less (OL≤35% Cs*) of the reference length Cs*. Accordingly, noise can be effectively reduced while ensuring the aerodynamic performance, which is the objective of the slat 202.

On the other hand, the amount of overlap OL tends to be 10% Cs* or more on an inboard side of the aircraft wing 100 relative to the engine 40. However, effective noise reduction by extending the trailing edge portion 22 cannot be exhibited because a relative ratio (Cs*/Cstow) of the reference length Cs* to the chord length Cstow (see FIG. 8) of the aircraft wing 100 on a cruise mode on which the slats 20 and the flaps 30 are retracted is 10% or less, resulting in the slats 20 as a whole too close to the main wing 10. Moreover, if the relative ratio (Cs*/Cstow) is 20% or more, the slats 20 are structurally too large relative to the main wing 10.

Therefore, an optimal parameter range of the amount of overlap OL in Configuration Example 2 is $$10\% \leq (OL/Cs^*) \leq 35\% \text{ and } 10\% \leq (Cs^*/Cstow) \leq 20\%.$$

Figure 12:
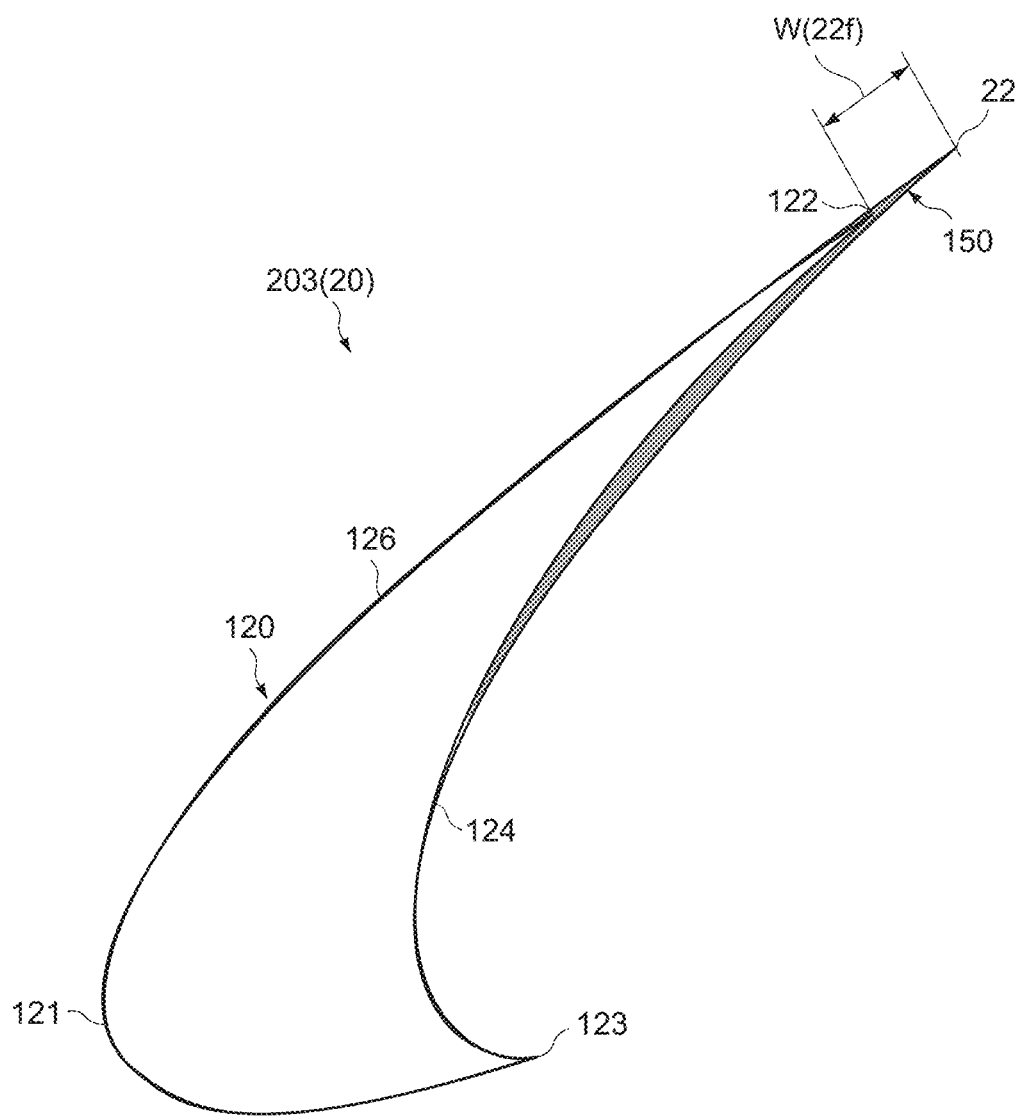
FIG. 12 A similar cross-sectional view showing a modified example of a configuration of the slat shown in FIG. 10.

Also, in this configuration example, the amount of extension of the trailing edge portion 22 may be uniform in the wing span direction or at least a partial region may be formed as the trailing edge extension portion 22f. The trailing edge extension portion 22f may be formed as a separate member added to a trailing edge portion of the existing slat. For example, FIG. 12 schematically shows, as another configuration example of the leading-edge high-lift device (slat 20) according to the present embodiment, a slat 203 obtained by adding to the trailing edge portion 122 of the reference slat 120 shown in FIG. 4 an adjustment member 150 capable of adjusting its amount of extension. In FIG. 12, the adjustment member 150 forms the trailing edge portion 22 by extending the trailing edge portion 122 of the reference slat 120 by an arbitrary amount of adjustment W. The adjustment member 150 forms the trailing edge extension portion 22f on the trailing edge portion 122 by being arranged to overlap on a part of the lower surface portion 124 or the upper surface portion 126 as shown in the figure. The adjustment member 150 is made of, for example, a metal material such as an aluminum alloy or stainless steel or a composite material such as carbon fiber reinforced plastics (CFRP) or glass fiber reinforced plastics (GFRP). The shape of the extended region of the trailing edge portion is also not particularly limited. In a case where the extended region of the trailing edge portion is arranged in a partial region, the extended region of the trailing edge portion has a trapezoidal shape, for example, as in the trailing edge extension portion 22e shown in FIG. 3.

In the slat 203 shown in FIG. 12, as in Configuration Example 2, an optimal parameter range of the amount of overlap OL, which is a distance between the tip end portion of the trailing edge extension portion 22f and the fixed leading edge 10a measured on the chord line of the slat 203 at the maximum deployment from the fixed leading edge 10a, is:

$$10\% \leq (OL/Cs^*) \leq 35\% \text{ and } 10\% \leq (Cs^*/Cstow) \leq 20\%.$$

<Characteristic Assessment>

Figure 13:
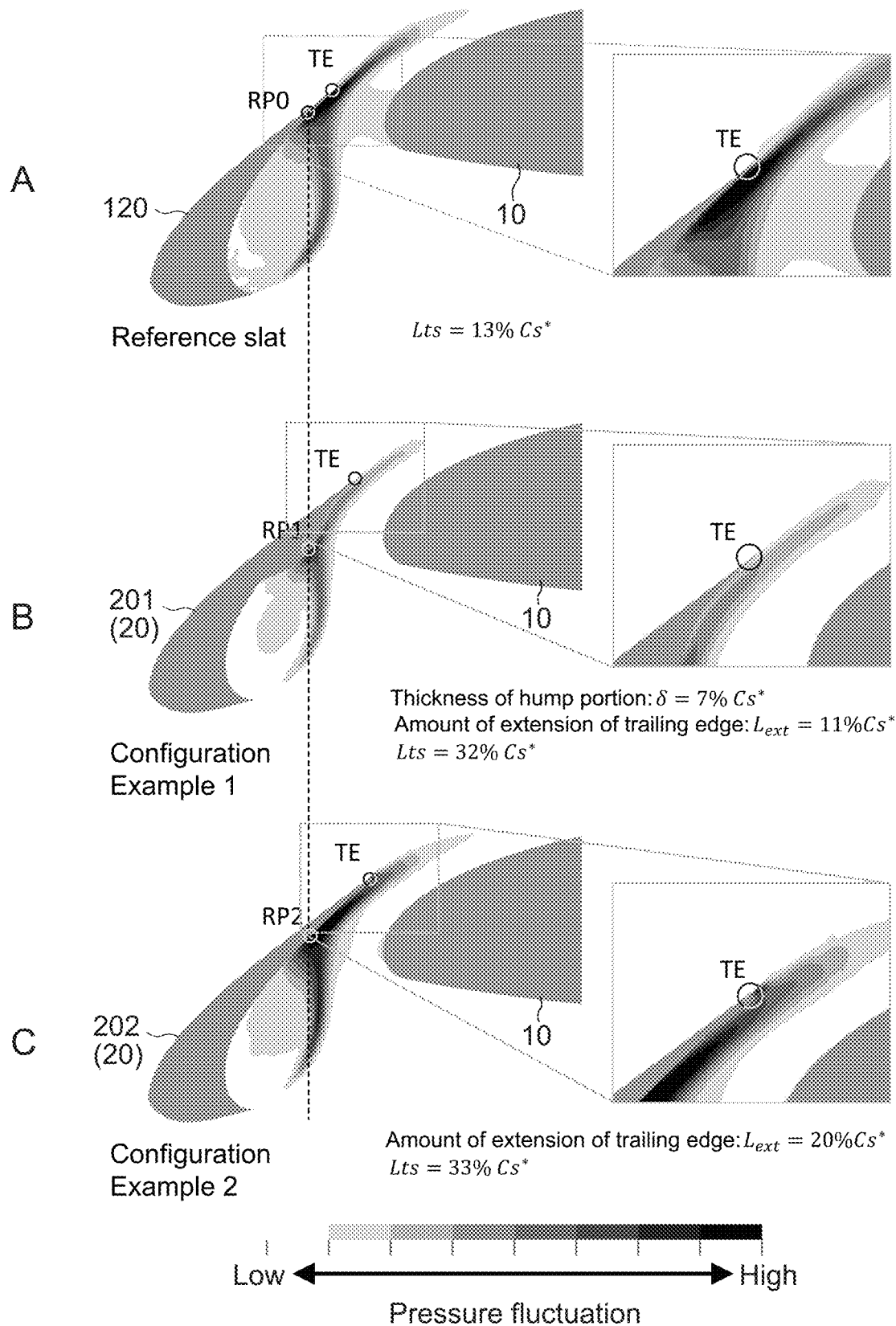
FIG. 13 A numerical simulation result showing pressure fluctuations of a slat trailing edge portion, which cause noise generation, in which "A" shows an example of the reference slat, "B" shows an example of the slat according to Configuration Example 1, and "C" shows an example of the slat according to Configuration Example 2.

FIG. 13 is numerical simulation results showing pressure fluctuations of a slat trailing edge portion, which cause noise generation, in which A shows an example of the reference slat 120, B shows an example of the slat 201 according to Configuration Example 1, and C shows an example of the slat 202 according to Configuration Example 2.

Here, the distance (Lts0) between the reattachment point RP0 of the shear layer on the reference slat 120 and the trailing edge portion 122 was 13% Cs*.

Moreover, the distance (Lts1) between the reattachment point RP1 of the shear layer and the trailing edge portion 22 was 32% Cs* when the maximum thickness δ of the hump portion 25 was set to 7% Cs* and a trailing edge extension amount was set to 11% Cs* in the slat 201 according to Configuration Example 1.

In addition, the distance (Lts2) between the reattachment point RP2 of the shear layer and the trailing edge portion 22 was 33% Cs* when a trailing edge extension amount was set to 20% Cs* in the slat 202 according to Configuration Example 2.

As shown in A to C of FIG. 13, as a characteristic of the flow on the slat, the position (reattachment point RP0, RP1, RP2) where the turbulent shear layer in the cove (on lower surface portion) reattaches to the slat lower surface hardly changes in the chord direction of the aircraft wing unless the flow rate of a flow passing through a gap between the slat trailing edge (TE in the figure (corresponding to the trailing edge portion 122, 22) and the main wing 10 and the position of the cusp portion greatly change.

In the present embodiment, using this characteristic, pressure fluctuations of the slat trailing edge TE (trailing edge portion 22), which cause noise, are reduced.

That is, in the present invention, as shown in FIGS. 7 and 11, the distance Lts1 and Lts2 from the reattachment point RP1 and RP2 to the trailing edge portion 22 is increased by providing the hump portion 25 to the slat lower surface or extending the trailing edge portion 22, pressure fluctuations toward the trailing edge portion 22 from the reattachment point RP1 and RP2 are further attenuated, and pressure fluctuations at the trailing edge portion 22 are reduced.

As a result, as shown in FIGS. 13 B and C, it can be seen that the pressure fluctuations at the slat trailing edge TE decrease in comparison with the pressure fluctuations of the reference slat 120 (FIG. 13A).

Figure 14:
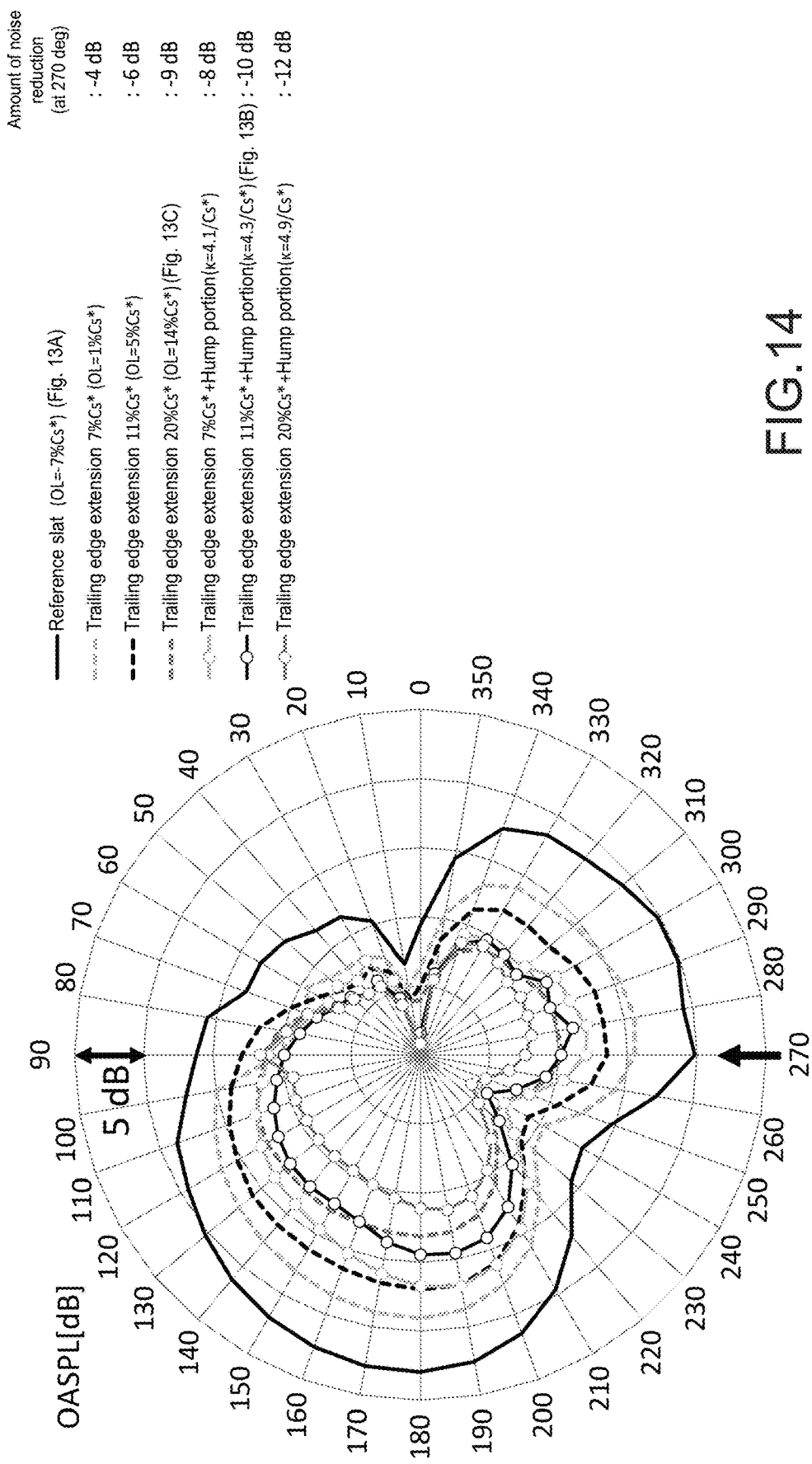
FIG. 14 A numerical simulation result of overall sound pressure level (OASPL) directivity when slat noise is assessed.

Next, FIG. 14 shows a numerical simulation result of overall sound pressure level (OASPL) directivity when slat noise was assessed on the scale of a regional jet airliner. Seven types of slats, as follows, were used for the analysis.

Slat 1: a reference slat (OL amount=−7% Cs*)
Slat 2: a slat with a trailing edge extension amount of 7% Cs* (OL amount=1% Cs*)
Slat 3: a slat with a trailing edge extension amount of 11% Cs* (OL amount=5% Cs*)
Slat 4: a slat with a trailing edge extension amount of 20% Cs* (OL amount=14% Cs*)
Slat 5: a slat with a trailing edge extension amount of 7% Cs* and a hump portion (average curvature κ=4.1/Cs*)
Slat 6: a slat with a trailing edge extension amount of 11% Cs* and a hump portion (average curvature κ=4.3/Cs*)
Slat 7: a slat with a trailing edge extension amount of 20% Cs* and a hump portion (average curvature κ=4.9/Cs*)

As shown in FIG. 14, as to the slats 2 to 7, significant noise reduction is found in all directions in comparison with the slat 1. In particular, a large noise reduction effect is obtained in the ground direction (at 270 degrees): 4 dB for the slat 2, 3 dB for the slat 3, 9 dB for the slat 4, 8 dB for the slat 5, 10 dB for the slat 6, and 12 dB for the slat 7. That is, the slats 2 to 4, which only extend the trailing edge, reduce noise by 4 dB to 9 dB, and the slats 5 to 7, which add the hump portion (average curvature 4/Cs* or more), further reduce noise by about 4 dB.

It should be noted that in the assessment example shown in FIG. 14, the OL amount of the reference slat refer to the slat 1 was set to −7% Cs*. However, the noise reduction effect by 4 dB or more cannot be expected with the OL amount of the slat 2 or 3 because the OL amount of the existing slat is often around 0% Cs*. Thus, in order to obtain a significant noise reduction effect for the reference slat with an OL amount of around 0% Cs*, a trailing edge extension amount for the reference slat is favorably 10% Cs* or more in a case where the hump portion is not provided.

Figure 15:
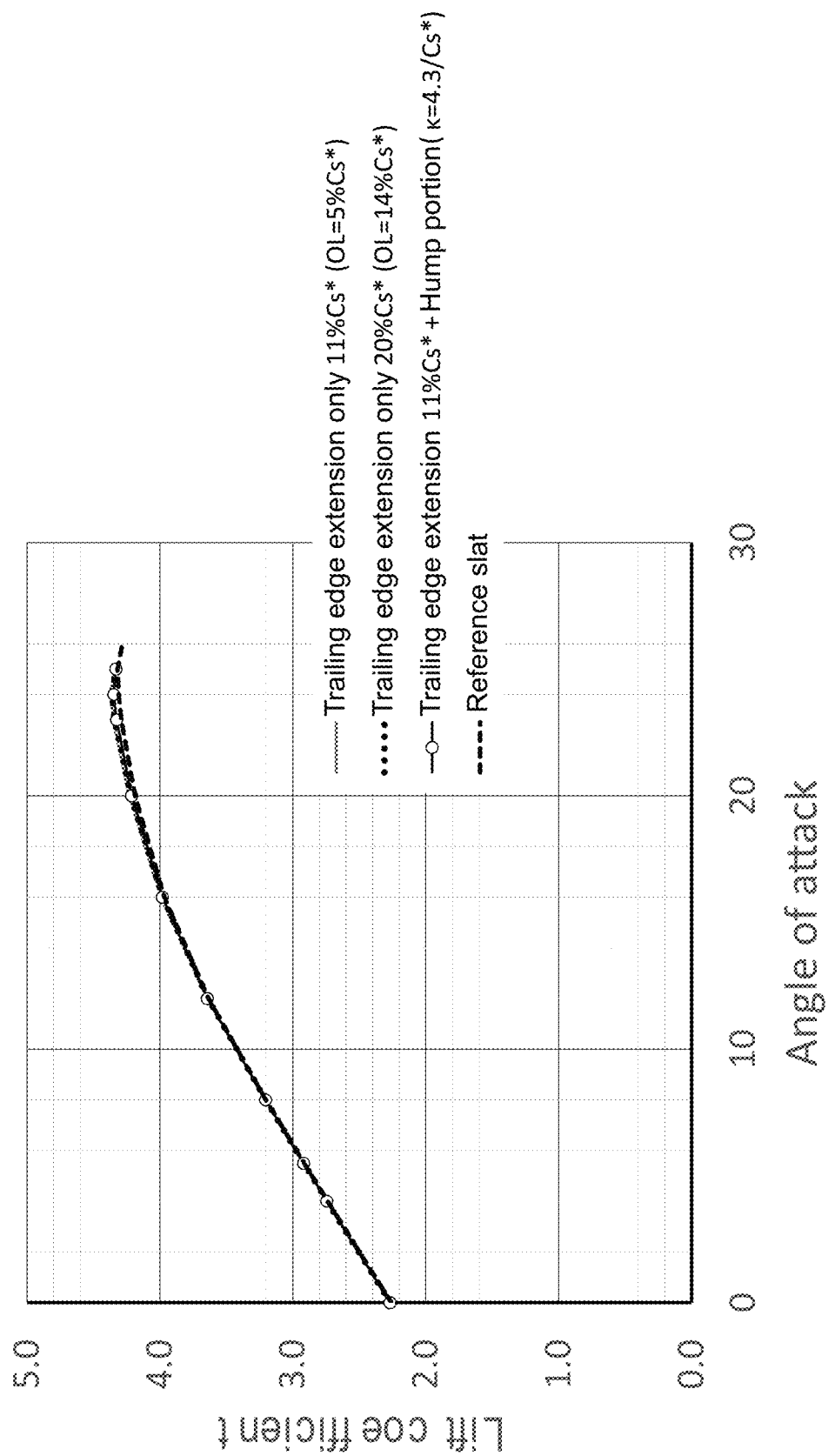
FIG. 15 A numerical simulation result of lift characteristics.

FIG. 15 shows a numerical simulation result of lift characteristics for the slats 1, 3, 4, and 6. In FIG. 15, the horizontal axis indicates an angle of attack and the vertical axis indicates a lift coefficient. As shown in the figure, it has been confirmed that all the slats 1, 3, 4, and 6 provide substantially the same maximum lift as the reference-shape slat 1 and can maintain the functions of the slats as the high-lift devices.

Figure 16:
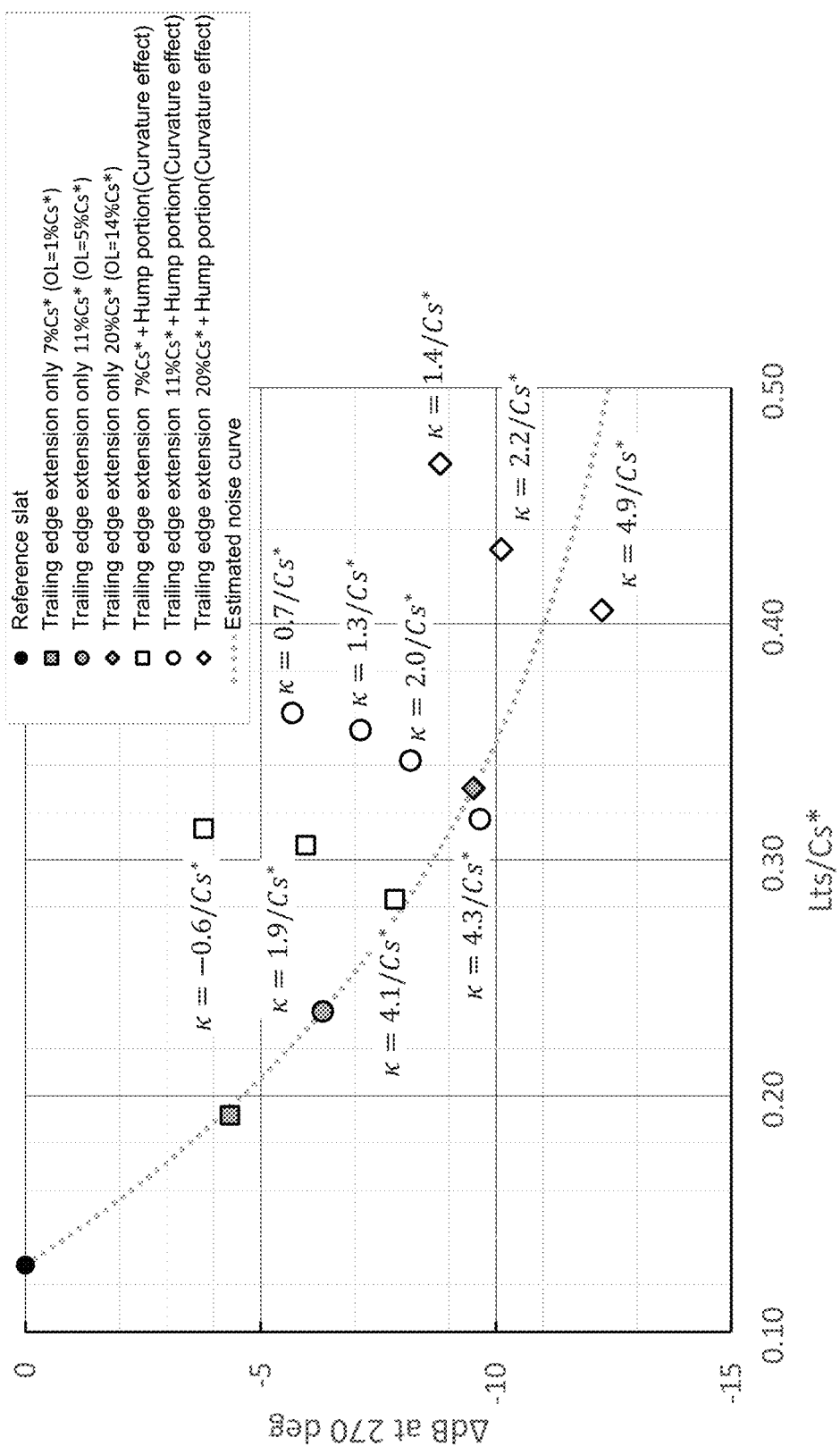
FIG. 16 A graph describing shape effects associated with noise reduction of the slats according to Configuration Examples 1 and 2 compared to the overall sound pressure level of the reference slat shown in FIG. 14 in a ground direction (at 270 degrees).

Next, FIG. 16 is a graph showing the noise reduction effects of the slats 2 to 7, comparing the overall sound pressure level at 270 degrees with the slat 1 (reference slat) shown in FIG. 14. In the figure, the horizontal axis indicates a relative ratio (Lts/Cs*) of the distance Lts between the reattachment point and the trailing edge portion to the reference length Cs* (see FIG. 6) and the vertical axis indicates a difference from the sound pressure level of the slat 1 at 270 degrees.

As shown in FIG. 16, the noise reduction effect tends to be enhanced with a slat shape at a higher relative ratio of the distance Lts to the reference length Cs*.

Moreover, it has been found that as to the slat shape according to Configuration Example 1 with the hump portion 25, the level of the noise reduction effect varies depending on the average curvature κ of the top portion 25p of the hump portion 25, and typically, a more significant noise reduction effect is obtained with an increase in the average curvature κ.

In addition, as a result of checking the noise reduction effect by arbitrarily adjusting the average curvature κ in the slats 5 to 7, as shown in FIG. 16, it has been found that setting the average curvature κ to be 2.0/Cs* or more is more effective for large noise reduction than the slats 2 to 4 with the same trailing edge extension amount. In particular, the average curvature is favorably set to provide a noise reduction effect equivalent or nearly equivalent to an estimated noise curve shown as the broken line in the figure.

Another Embodiment

Next, another embodiment of the present invention will be described with reference to FIG. 17. In the present embodiment, an application example to a Krueger flap 320 as the high-lift device will be described.

Figure 17:
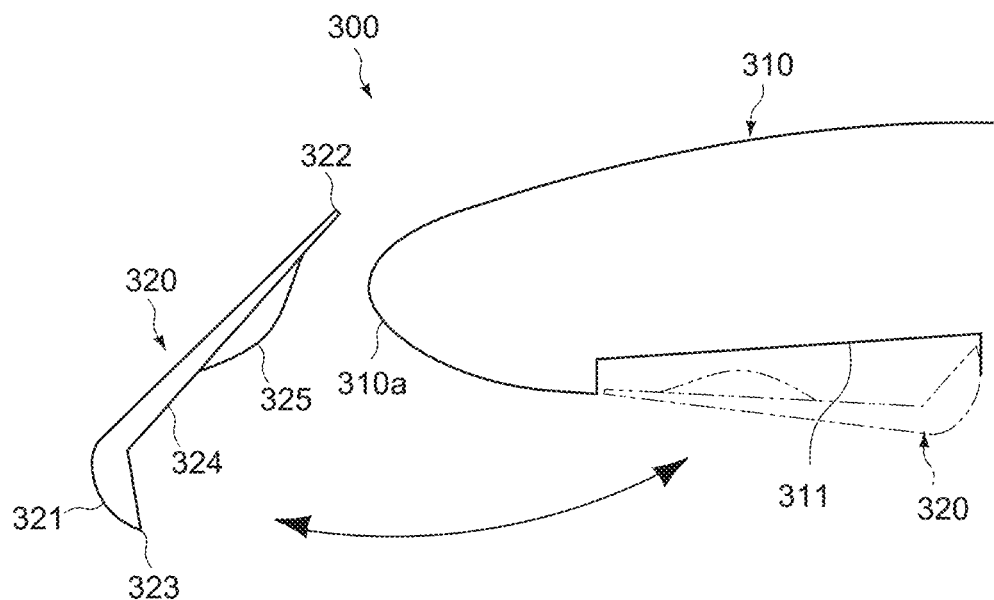
FIG. 17 A cross-sectional view of a Krueger flap as the leading-edge high-lift device according to the present embodiment, which is perpendicular to the wing span direction.

FIG. 17 is a cross-sectional view of the Krueger flap 320 as the leading-edge high-lift device according to the present embodiment, which is perpendicular to a wing span direction of an aircraft wing 300. FIG. 17 shows a state in which the Krueger flap 320 is deployed at the maximum (fully deployed) from a fixed leading edge 310a.

The Krueger flap 320 includes a leading edge portion 321, a trailing edge portion 322, a cusp portion 323, a lower surface portion 324, and a hump portion 325, as in the slat 201. The Krueger flap 320 is made of, for example, a metal material such as an aluminum alloy or stainless steel or a composite material such as carbon fiber reinforced plastics (CFRP) or glass fiber reinforced plastics (GFRP).

The trailing edge portion 322 forms a gap between the trailing edge portion 322 and a main wing 310 during deployment.

The cusp portion 323 is formed at a lower edge of the leading edge portion 321.

The lower surface portion 324 is a concave surface formed between the cusp portion 323 and the trailing edge portion 322.

The hump portion 325 is locally provided on a surface of the lower surface portion 324 and has a curved shape protruding toward the main wing 310 in the cross-sectional shape perpendicular to the wing span direction.

The hump portion 325 is provided in a region of the lower surface portion 324 where a turbulent shear layer reattaches. Forming the hump portion 325 in the curved shape protruding toward the main wing 310 enables the distance Lts that is a distance along the lower surface between the reattachment point (corresponding to RP1 in FIG. 6) of the turbulent shear layer and a trailing edge 322. Accordingly, pressure fluctuations at the trailing edge portion 322 can be reduced and noise reduction can be achieved.

Details of the hump portion 325 are similar to the hump portion 25 on the slat 201, so a description thereof will be omitted. It should be noted that the hump portion 325 does not need to be configured to be deformable during retraction into the main wing 310 because the Krueger flap 320 is configured to be stowed in a storage portion 311 mounted on the lower surface of the main wing 310.

The trailing edge portion 322 can be configured to be similar to the trailing edge portion 22 in the above-mentioned slat 201 or 202. Also in this case, the trailing edge portion 322 may be extended toward the main wing 10 so as to increase the amount of overlap with the main wing 310. Accordingly, the distance Lts between the reattachment point of the turbulent shear layer on the lower surface portion 324 and the trailing edge portion 322 can be increased. Therefore, pressure fluctuations at the trailing edge portion 322 can be reduced and noise reduction can be achieved.

Furthermore, the adjustment member (see FIG. 12) that adjusts the amount of overlap with the fixed leading edge 10a may also be applied in the present embodiment. Accordingly, adding the adjustment member to the existing Krueger flaps can provide mechanisms and effects similar to those described above.

REFERENCE SIGNS LIST 10, 310 main wing
20, 201, 202, 203 slat (leading-edge high-lift device)
21, 321 leading edge portion
22, 322 trailing edge portion
22e, 22f trailing edge extension portion
23, 323 cusp portion
24, 324 lower surface portion
25, 325 hump portion
150 adjustment member
320 Krueger flap (leading-edge high-lift device)

The invention claimed is:
1. A leading-edge high-lift device that is deployable and retractable from/into a fixed leading edge of a main wing of an aircraft, comprising:
a leading edge portion;
a trailing edge portion that forms a gap between a trailing edge portion and the main wing during deployment;
a cusp portion formed at a lower edge of the leading edge portion;
a lower surface portion formed between the cusp portion and the trailing edge portion; and
a curved hump portion that is locally provided on a surface of the lower surface portion and protrudes toward the main wing in a cross-sectional shape perpendicular to a wing span direction of the main wing, wherein, assuming that in a cross-sectional shape perpendicular to the wing span direction of the main wing, a distance between the leading edge portion and the fixed leading edge, which is measured on a chord line of the leading-edge high-lift device during maximum deployment from the fixed leading edge, is a first distance and a distance between a top portion of the hump portion and the fixed leading edge, which is measured on the chord line of the leading-edge high-lift device during maximum deployment from the fixed leading edge, is a second distance, the second distance is 10% or more and 40% or less of the first distance.

2. A leading-edge high-lift device that is deployable and retractable from/into a fixed leading edge of a main wing of an aircraft, comprising:

a leading edge portion;

a trailing edge portion that forms a gap between a trailing edge portion and the main wing during deployment;

a cusp portion formed at a lower edge of the leading edge portion;

a lower surface portion formed between the cusp portion and the trailing edge portion; and a curved hump portion that is locally provided on a surface of the lower surface portion and protrudes toward the main wing in a cross-sectional shape perpendicular to a wing span direction of the main wing, wherein, assuming that in a cross-sectional shape perpendicular to the wing span direction of the main wing, a distance between the leading edge portion and the fixed leading edge, which is measured on a chord line of the leading-edge high-lift device during maximum deployment from the fixed leading edge, is a first distance, a maximum thickness of the hump portion from the surface of the lower surface portion is 5% or more and 15% or less of the first distance.

3. A leading-edge high-lift device that is deployable and retractable from/into a fixed leading edge of a main wing of an aircraft, comprising:

a leading edge portion;

a trailing edge portion that forms a gap between a trailing edge portion and the main wing during deployment;

a cusp portion formed at a lower edge of the leading edge portion;

a lower surface portion formed between the cusp portion and the trailing edge portion; and a curved hump portion that is locally provided on a surface of the lower surface portion and protrudes toward the main wing in a cross-sectional shape perpendicular to a wing span direction of the main wing, wherein, assuming that in a cross-sectional shape perpendicular to the wing span direction of the main wing, a distance between the leading edge portion and the fixed leading edge, which is measured on a chord line of the leading-edge high-lift device during maximum deployment from the fixed leading edge, is a first distance, an average curvature of a top portion of the hump portion is double or more than double and ten times or less than ten times a multiplicative inverse of the first distance.

4. A leading-edge high-lift device that is deployable and retractable from/into a fixed leading edge of a main wing of an aircraft, comprising:

a leading edge portion;

a trailing edge portion that forms a gap between a trailing edge portion and the main wing during deployment;

a cusp portion formed at a lower edge of the leading edge portion;

a lower surface portion formed between the cusp portion and the trailing edge portion; and a curved hump portion that is locally provided on a surface of the lower surface portion and protrudes toward the main wing in a cross-sectional shape perpendicular to a wing span direction of the main wing, wherein, assuming that in a cross-sectional shape perpendicular to the wing span direction of the main wing, a distance between the leading edge portion and the fixed leading edge, which is measured on a chord line of the leading-edge high-lift device during maximum deployment from the fixed leading edge, is a first distance, an amount of overlap that is a distance between the trailing edge portion and the fixed leading edge, which is measured on the chord line of the leading-edge high-lift device during maximum deployment from the fixed leading edge, is 35% or less of the first distance.

5. The leading-edge high-lift device according to claim 4, further comprising an adjustment member that is attached to at least a part of the trailing edge portion and adjusts the amount of overlap.

6. The leading-edge high-lift device according to claim 1, wherein the hump portion is configured to expand during deployment from the fixed leading edge and be deformable along the fixed leading edge during retraction into the fixed leading edge.

7. A leading-edge high-lift device that is deployable and retractable from/into a fixed leading edge of a main wing of an aircraft, comprising:

a leading edge portion;

a trailing edge portion that forms a gap between a trailing edge portion and the main wing during deployment;

a cusp portion formed at a lower edge of the leading edge portion;

a lower surface portion formed between the cusp portion and the trailing edge portion; and a trailing edge extension portion provided on at least a part of the trailing edge portion, wherein assuming that in a cross-sectional shape perpendicular to the wing span direction of the main wing, a distance between the leading edge portion and the fixed leading edge, which is measured on a chord line of the leading-edge high-lift device during maximum deployment from the fixed leading edge, is a first distance, an amount of overlap that is a distance between a tip end portion of the trailing edge extension portion and the fixed leading edge, which is measured on the chord line of the leading-edge high-lift device during maximum deployment from the fixed leading edge, is 10% or more and 35% or less of the first distance, and the first distance is 10% or more and 20% or less of a chord length of an aircraft wing during retraction of the leading-edge high-lift device into the fixed leading edge.

8. The leading-edge high-lift device according to claim 7, wherein the trailing edge extension portion is an adjustment member that is attached to the trailing edge portion and adjusts the amount of overlap.

9. A wing comprising the leading-edge high-lift device according to claim 1.

10. An aircraft comprising the leading-edge high-lift device according to claim 1.

11. A wing comprising the leading-edge high-lift device according to claim 7.

12. An aircraft comprising the leading-edge high-lift device according to claim 7.

\* \* \* \* \*